June 24, 1924.
F. H. BANBURY
MACHINE FOR TREATING PLASTIC COMPOUNDS
Filed April 28, 1923
1,498,986
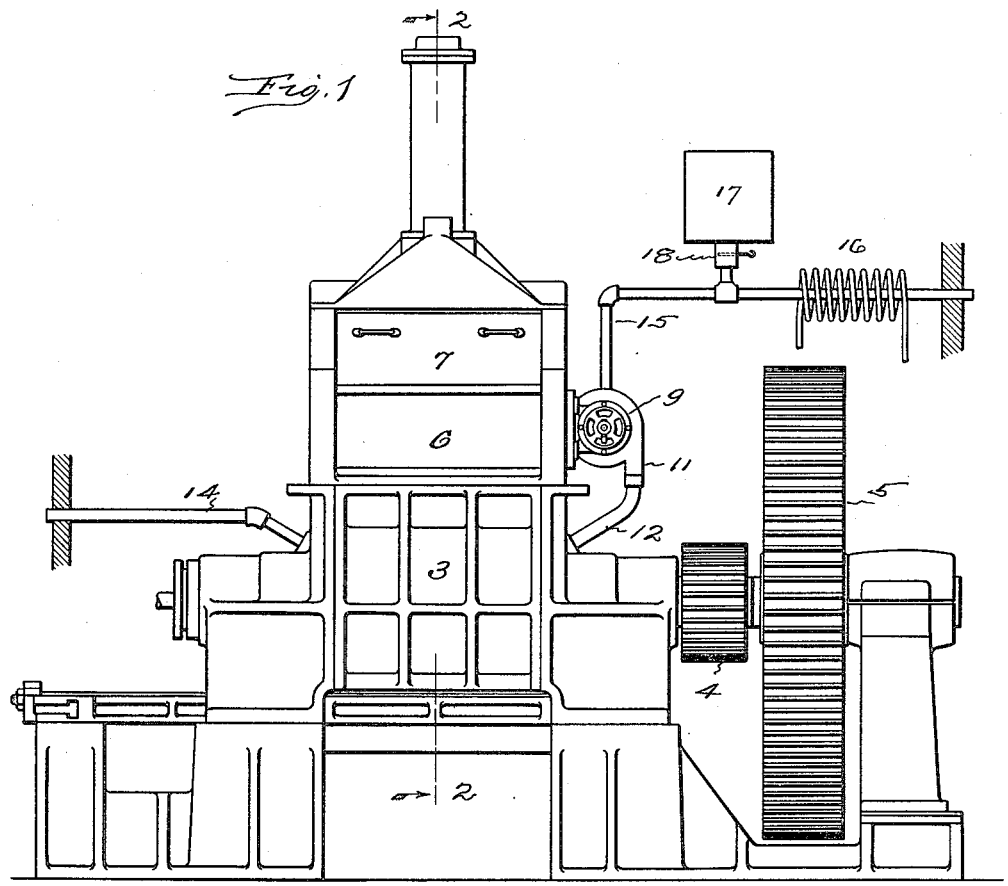
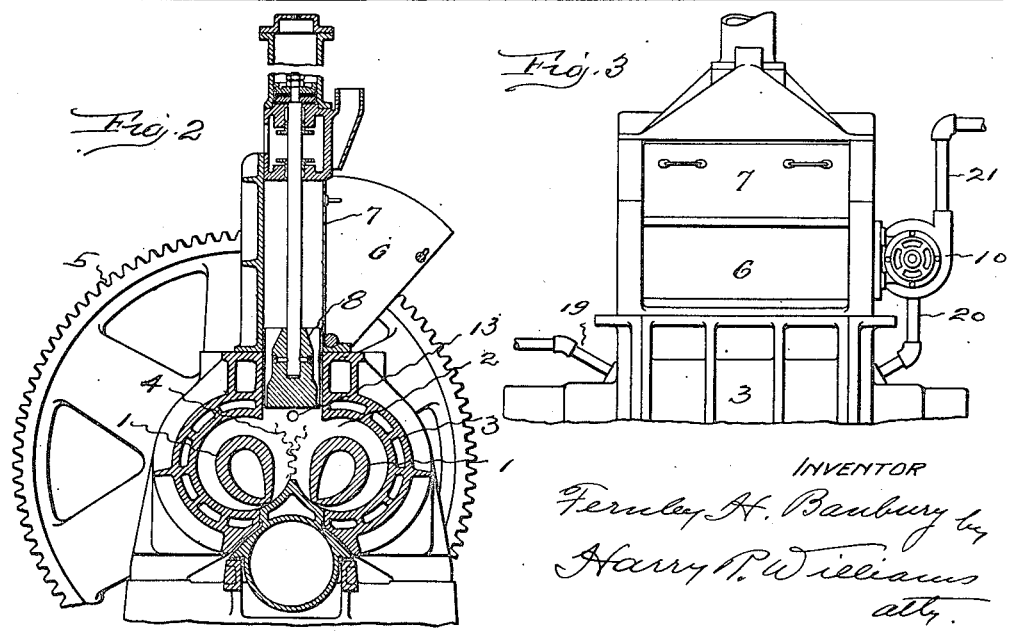
INVENTOR
Fernley H. Banbury by
Harry P. Williams
atty.

Patented June 24, 1924.

1,498,986

UNITED STATES PATENT OFFICE.

FERNLEY H. BANBURY, OF ANSONIA, CONNECTICUT, ASSIGNOR TO THE BIRMINGHAM IRON FOUNDRY, OF DERBY, CONNECTICUT, A CORPORATION OF CONNECTICUT.

MACHINE FOR TREATING PLASTIC COMPOUNDS.

Application filed April 28, 1923. Serial No. 335,374.

*To all whom it may concern:*

Be it known that I, FERNLEY H. BANBURY, a citizen of the United States, residing at Ansonia, in the county of New Haven and State of Connecticut, have invented a new and useful Improvement in Machines for Treating Plastic Compounds, of which the following is a specification.

This invention relates to those machines which are provided for breaking down or masticating rubber and compounding the same with fillers, manipulating mixed unvulcanized rubber products preparatory to feeding to calender or tubing machines, and for treating similar heavy doughs, and more particularly to the type of machines for such purposes which have a chamber containing one or more powerfully driven rotors that co-operate with the walls of the chamber to crush, break up and mix the stock that is fed into the chamber. A machine of this type is illustrated in United States Patent No. 1,200,070 of Oct. 3, 1916.

The stock whether in the form of crude rubber lumps or rubber and foreign material, when subjected to treatment in machines of this character, owing to the heat developed by the friction of the particles upon themselves and against the walls of the apparatus and moving parts, as the mass is pulled, stretched, crushed and compressed during mastication, tends to become hot. Undue heat acts injuriously on the rubber compound, causing partial or complete vulcanization, and also affects the permanency of the breaking down of the rubber. There is a limited range of temperature in which rubber can be broken down with the best results.

To keep the temperature within the proper limits and prevent the deleterious action of undue heat, it has been customary to water-jacket the casing and water-cool the rotors of machines of this character. On account of the great pressure exerted in these machines, to afford the required strength the metallic parts are necessarily heavy and massive, consequently the cooling medium is required to absorb the heat from a large mass of metal as well as from the stock being manipulated, and owing to the character of the stock,—its heat non-conducting qualities, and the frayed and irregular mass or series of masses which preclude dense and complete contact between the stock and the surrounding walls of the machine, the heat generated during manipulation is not, in the case of some stocks, thrown off, absorbed by the metal and conducted away by the cooling water as effectively as desired. In such cases the machines have to be closely watched and operated with care to prevent undue rise in temperature and overheating of the stock.

The object of this invention is to provide machines of this class with cooling means supplemental to the water jackets, that will eliminate the liability of overheating the stock and allow the machines to be run more efficiently and with less care, which supplemental cooling medium, besides being used to keep the temperature of the substance being treated at the most effective degree, and remove the moist atmosphere when treating wet rubber, may, if desired, be utilized to convey into the mixing chamber the various powders that are commonly compounded with rubber stock when it is being broken down, or which additional cooling medium may, under certain conditions, be employed to remove the finer particles of stock which have been sufficiently treated, and leave the particles that are not completely broken down and thoroughly mixed, in the machine for further treatment.

This object is attained by arranging apparatus in connection with these machines which will cause a flow of air at atmospheric temperature or below, directly through the mixing chambers when the machines are in operation, which air flow may be caused by pressure or by suction, and may be charged with material to be compounded with the stock being treated.

In the accompanying drawings Fig. 1 shows a front elevation of a machine of the type referred to provided with temperature controlling means which embodies this invention. Fig. 2 shows a vertical section of the machine on plane denoted by the dotted line 2—2 on Fig. 1. Fig. 3 shows a front view of a portion of the machine with a modified arrangement of supplemental cooling means.

In the machine illustrated there are two rotors 1 of well known form mounted in a chamber 2 in the water jacketed casing 3. The rotors are shown as hollow in order that they may be water cooled, and outside of the casing their shafts are provided with intermeshing pinions 4, one of the shafts having a driving gear 5. The stock to be treated is put into the rotor chamber through the hopper 6 when the door 7 is open and the floating weight 8 is raised. After the chamber has been charged the hopper door is closed and the floating weight is allowed to settle down upon the stock. When the machine is operated the stock is pulled, stretched, crushed and masticated between the surfaces of the rotors and the walls of the chamber in the manner usual to machines of the type referred to.

The friction of the particles of stock working upon themselves and against the active walls of the rotors and casing generates considerable heat. In the prior machines the temperature caused by this heat has been controlled to a more or less extent by means of the circulation of water through the casing and rotors. In manipulating some kinds of stock the water circulation has, owing to the character of the stock, not been sufficient to carry away the heat to the desired degree. To overcome this difficulty, according to the present invention, a circulation of air is caused through the mixing chamber in such manner and to such an extent that the temperature therein may be kept within the desired range for the effective treatment of the particular stock being manipulated. This air flow may be accomplished by arranging on the casing of the machine or adjacent thereto, a motor driven blower 9, as illustrated in Fig. 1, or a motor driven suction fan 10, as shown in Fig. 3.

In the case of the blower the outflow end 11 may be connected by a delivery pipe or hose 12 with a port 13 (Fig. 2) that opens to the interior at one end of the mixing chamber. A discharge pipe 14 may lead from any convenient point in the casing, as from a port at the end of the mixing chamber opposite the port 13, to any desired compartment or out of doors. The intake pipe 15 of the blower may lead from out of doors or any other suitable locality. The location of the ports for the inflow and outflow of air to the mixing chamber is immaterial, as their positions may be varied according to desire. A temperature reducing coil 16, may, if desired, be arranged adjacent to the intake pipe of the blower for the purpose of cooling the air drawn in by the blower. If it is desired to utilize the cooling air for carrying powder into the mixing chamber a receptacle 17 for powder, provided with a suitable valve 18, may be connected with the intake pipe so that when the valve is opened the inflowing air will be charged with and convey to the mixing chamber powder drawn from the receptacle.

If the suction fan is used the intake pipe 19 may lead through one end wall of the mixing chamber and the suction pipe 20 may lead from the other end of the wall of the chamber to the fan, while the discharge pipe 21 may lead to any suitable locality.

With such an apparatus as described a circulation of air of the proper amount may be kept up in the mixing chamber to carry off heat from the mass of stock being manipulated and keep the temperature in the chamber at the required degree for the most efficient work. With this arrangement the internal heat can never become so intense so as to deleteriously affect the stock being manipulated even if the water cooling circulation is insufficient to keep the temperature within the required range. Furthermore as stated, the air flow caused either by blowing or suction, may be utilized to convey powders to the mixing chamber or the flow may be employed to carry off from the mixing chamber such small particles of stock as it is desired to remove from the mixing chamber, as well as moisture from wet stock.

The invention claimed is:—

1. A machine for treating plastic compounds which comprises a shell enclosing a mixing chamber, rotatable means within the mixing chamber for masticating stock, and means for causing a circulation of air within the mixing chamber.

2. A machine for treating plastic compounds which comprises a shell having a water jacketed mixing chamber, rotatable means within the mixing chamber for masticating stock, and means for causing a circulation of air within the mixing chamber.

3. A machine for treating plastic compounds which comprises a shell having a water jacketed mixing chamber, water cooled means rotatable within the mixing chamber for masticating stock, and means for causing a circulation of air within the mixing chamber.

4. A machine for treating plastic compounds which comprises a shell enclosing a mixing chamber, rotatable means within the mixing chamber for masticating stock, means for causing a circulation of air through the mixing chamber, and means for cooling said air before it enters the mixing chamber.

5. A machine for treating plastic compounds which comprises a shell enclosing a mixing chamber, rotatable means within the mixing chamber for masticating stock, means for causing a circulation of air through the mixing chamber, and means for charging the air with foreign matter before it enters the mixing chamber.

6. A machine for treating plastic compounds which comprises a shell having a water jacketed mixing chamber, a water cooled rotor within the mixing chamber, and a blower communicating with the mixing chamber for causing a circulation of air therethrough.

7. A machine for treating plastic compounds which comprises a shell having a water jacketed mixing chamber, a water cooled rotor within the mixing chamber for masticating stock, intake and discharge pipes communicating with the mixing chamber, and an air pump for causing a flow of air through said pipes and the mixing chamber.

8. A machine for treating plastic compounds which comprises a shell having a mixing chamber, rotatable means within the mixing chamber for masticating stock, means for causing a circulation of cooling fluid through said shell and rotatable means, and means for causing a circulation of cooling fluid through said mixing chamber.

FERNLEY H. BANBURY.